Figure 6:
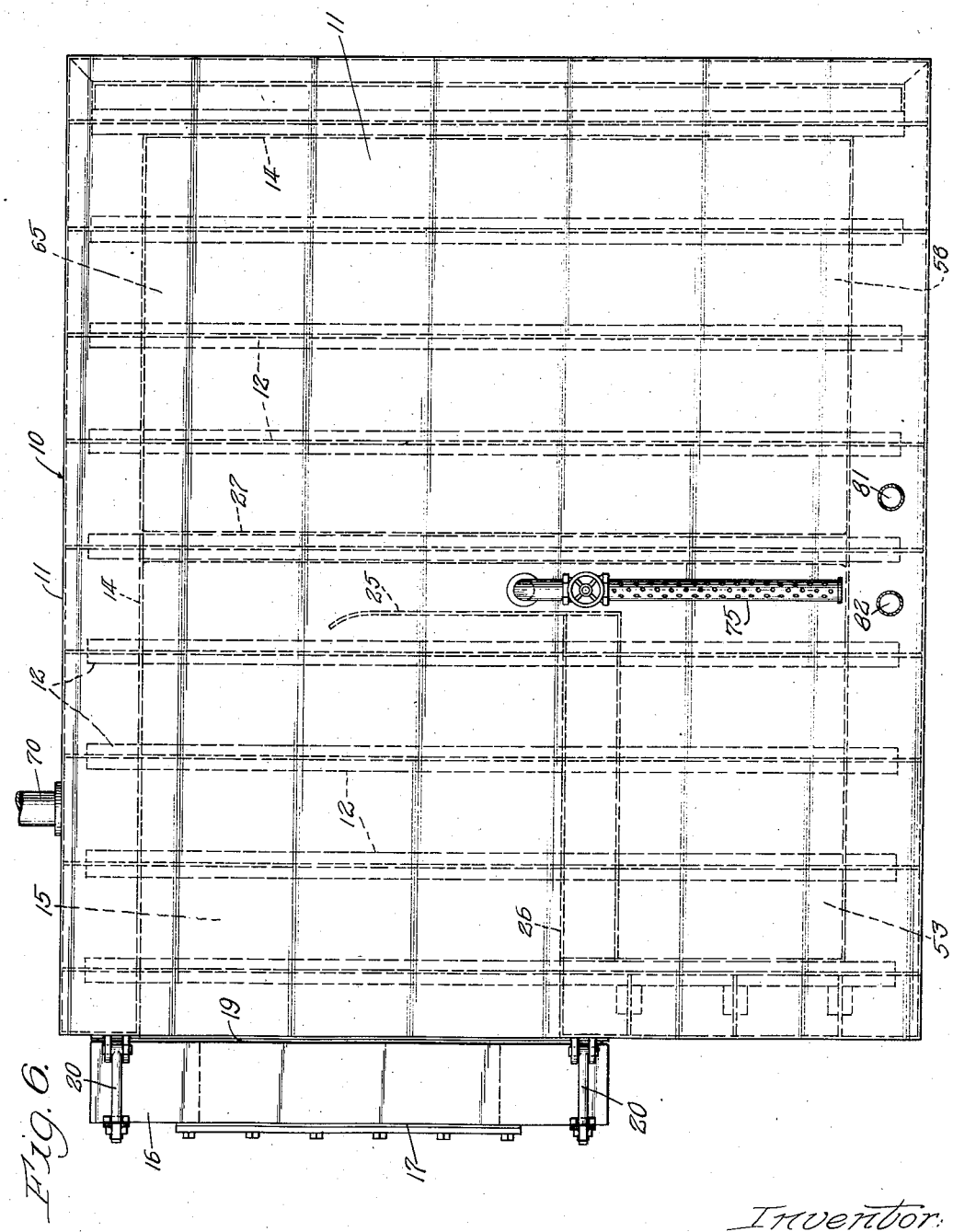

Sept. 27, 1949.  A. H. HEINEMAN  2,482,753
STRATOSPHERE CHAMBER
Filed June 22, 1944  5 Sheets-Sheet 1
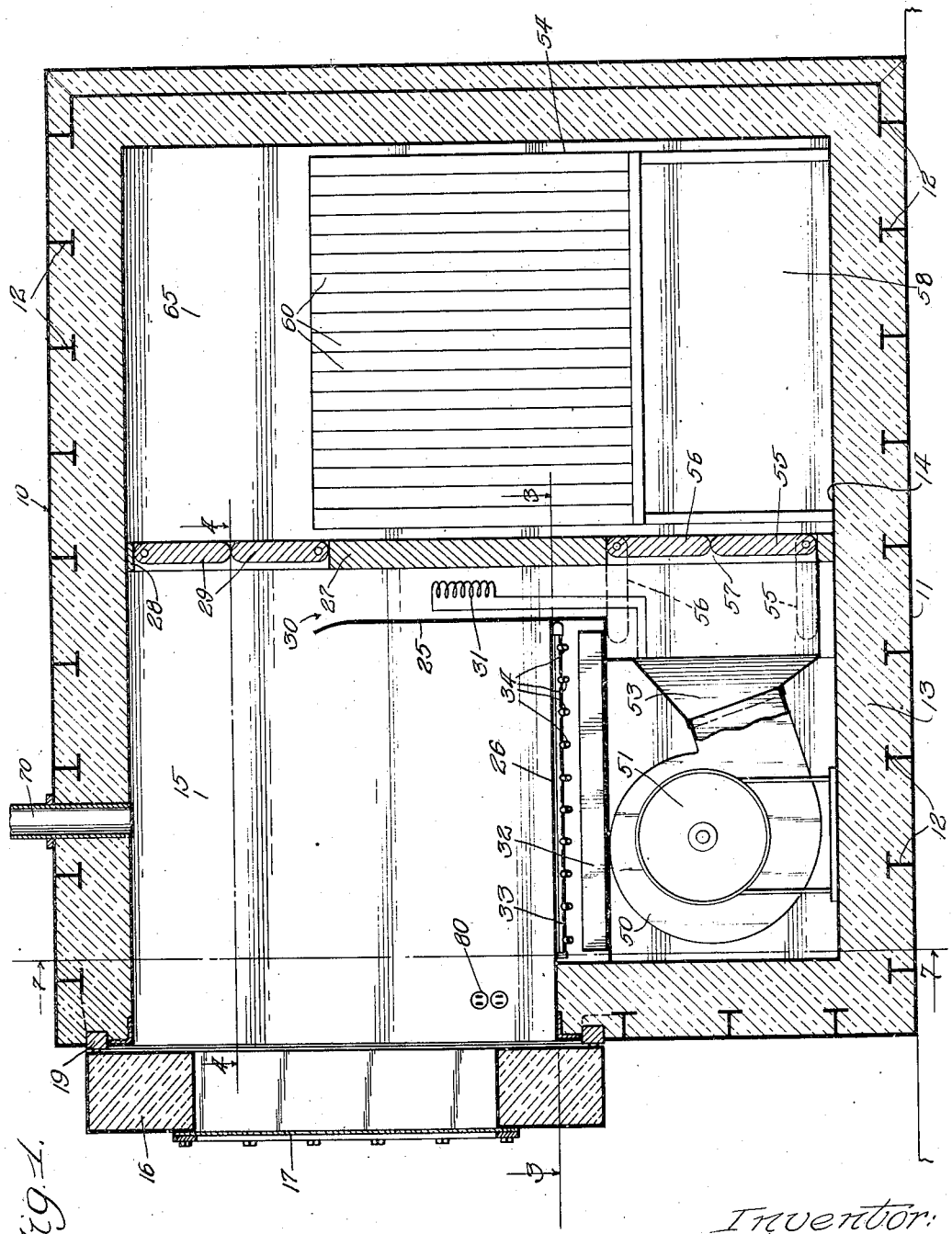

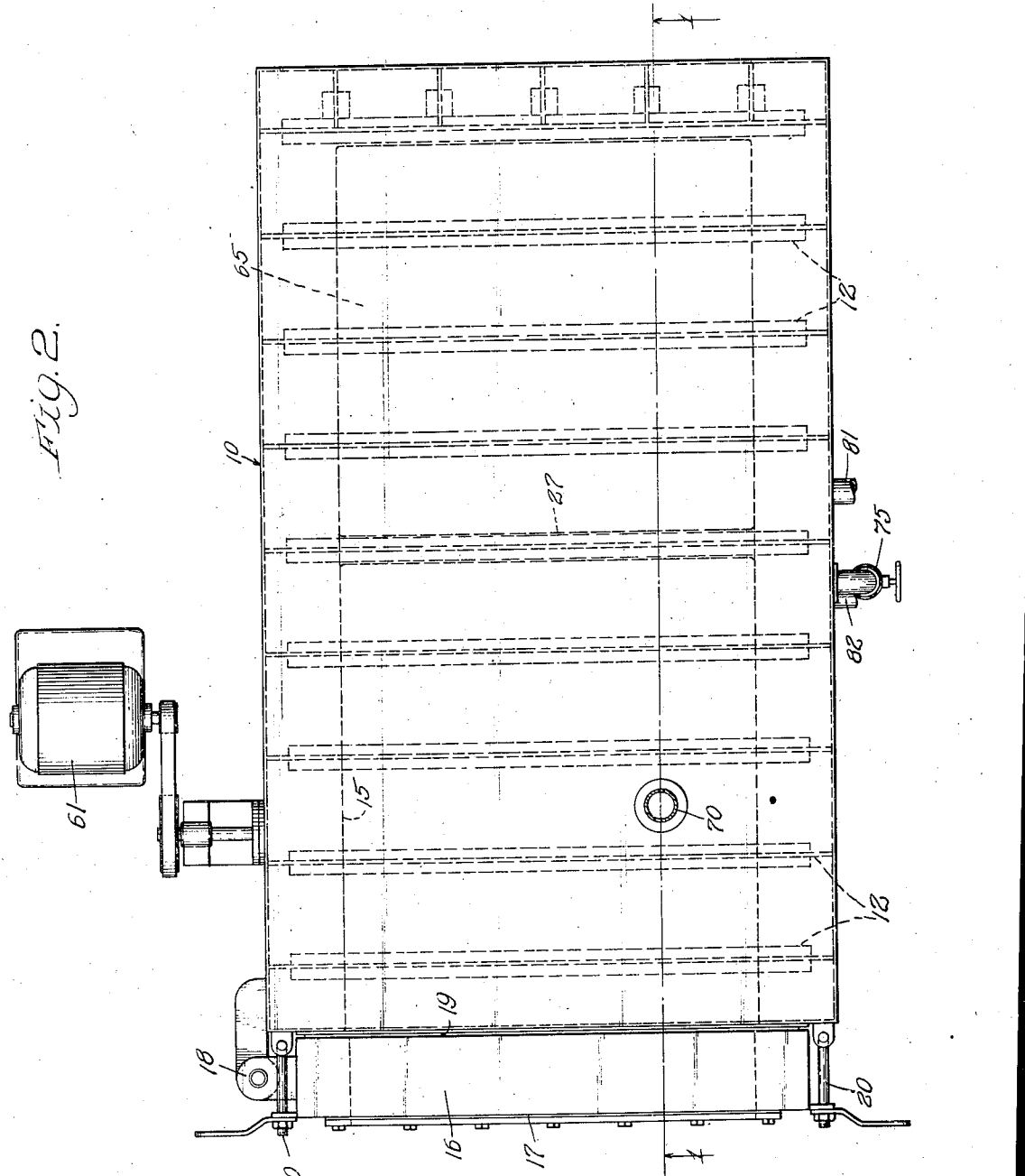

Sept. 27, 1949.  A. H. HEINEMAN  2,482,753
STRATOSPHERE CHAMBER
Filed June 22, 1944  5 Sheets-Sheet 3
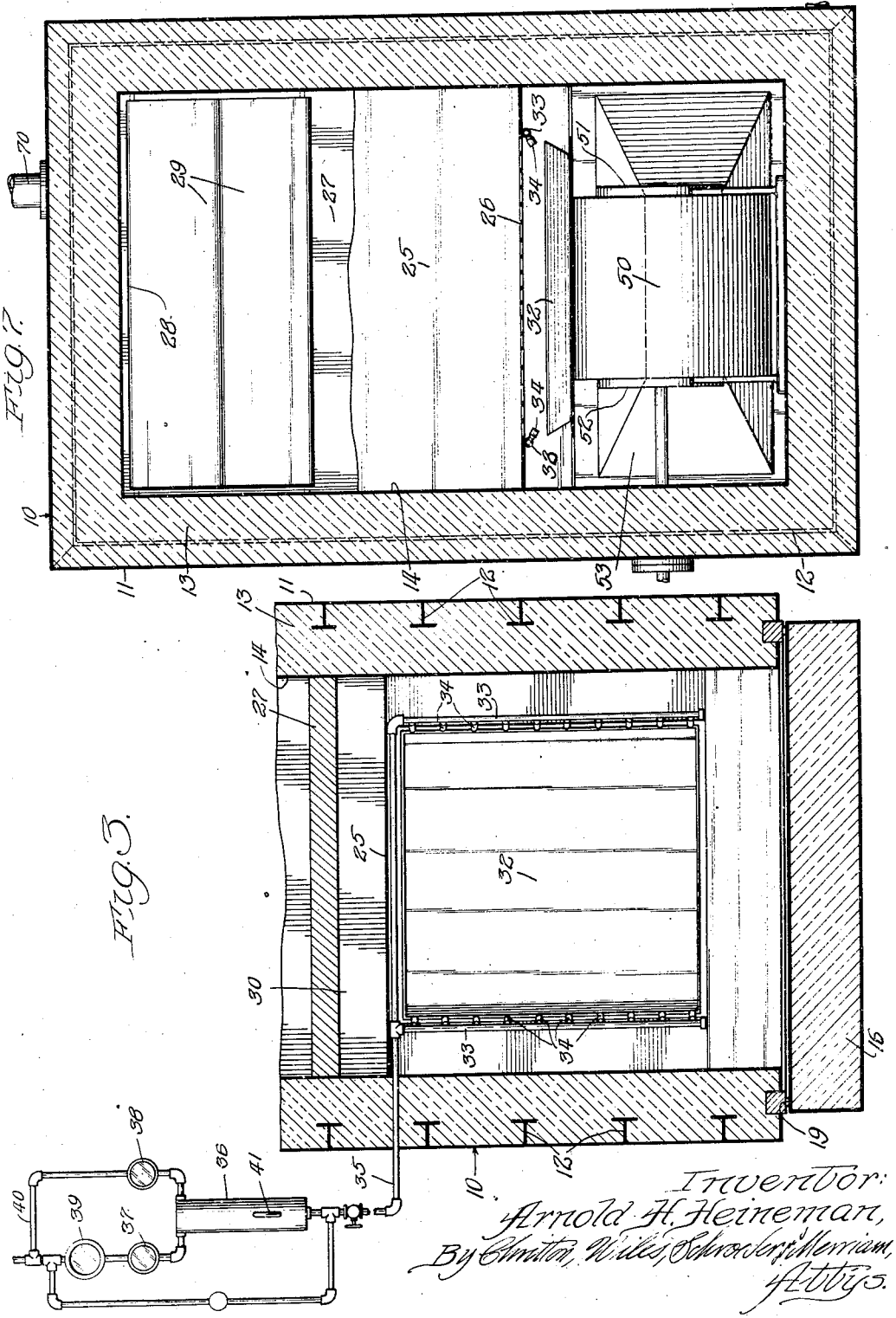

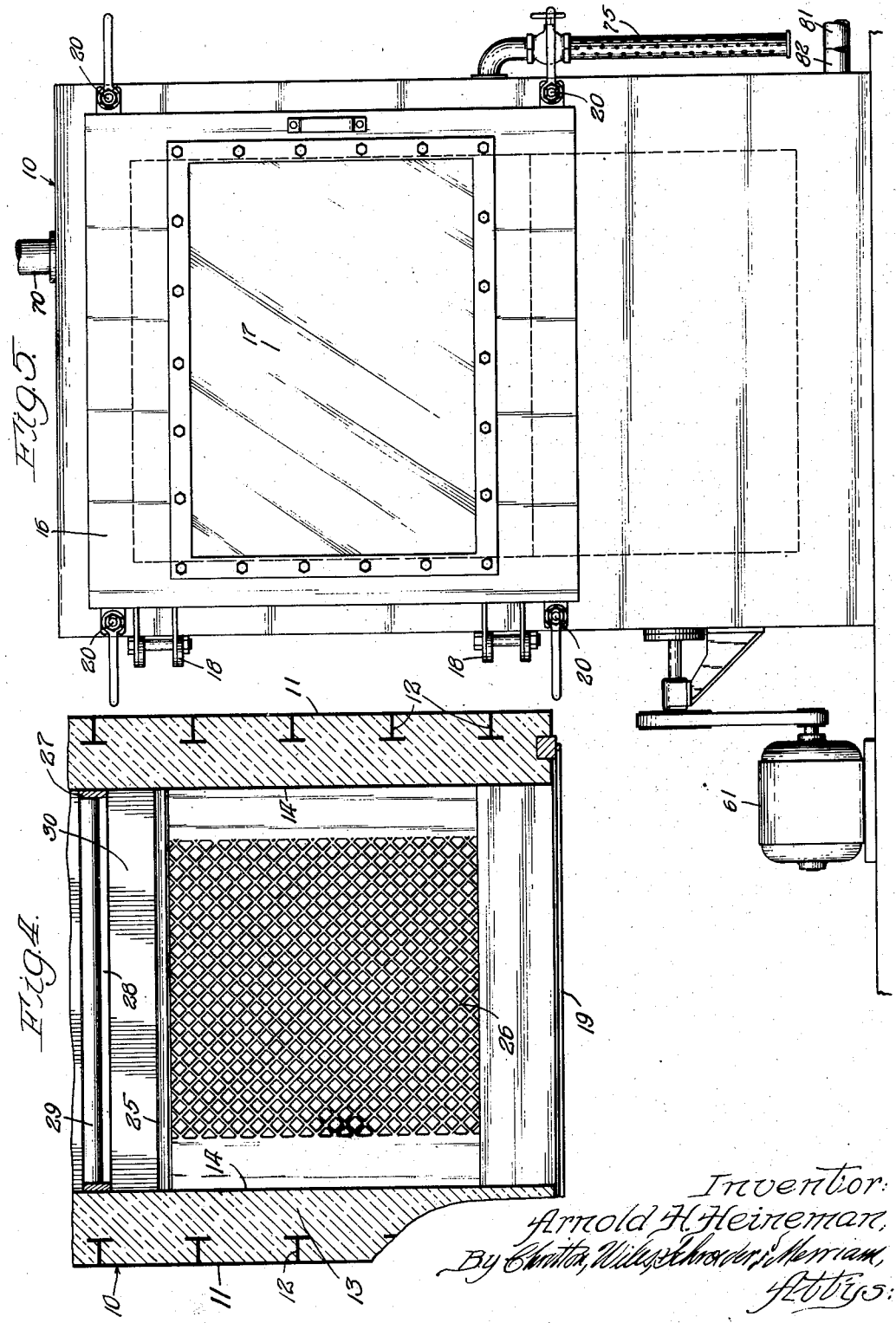

Sept. 27, 1949.　　　A. H. HEINEMAN　　　2,482,753
STRATOSPHERE CHAMBER
Filed June 22, 1944　　　　　　　　5 Sheets-Sheet 5

Inventor:
Arnold H. Heineman,
By Stritton, Wiles, Schroeder, Merriam,
Attys.

Patented Sept. 27, 1949

2,482,753

UNITED STATES PATENT OFFICE 2,482,753

STRATOSPHERE CHAMBER

Arnold H. Heineman, Chicago, Ill., assignor to Vacuum Process Corporation, a corporation of Illinois Application June 22, 1944, Serial No. 541,516

2 Claims. (Cl. 257—9)

This invention relates to a stratosphere chamber and more particularly to a self-contained heat insulated chamber which is readily portable if desired, within which equipment of various types may be submitted to testing at the extremes of atmospheric conditions of temperature, pressure and humidity.

As is well known, the necessities of warfare have caused machinery to be subjected to extremes of temperature, both high and low, to extremes of humidity, both high and low, and to a wide range of atomspheric pressure conditions. It is desirable to have equipment tested under these conditions and the present invention relates to a very simple portable structure providing extremely accurate control and a relatively great area of testing chamber as compared to the total size of the unit. The chamber is illustrated in the drawings in which Figure 1 is a sectional side elevation of the chamber; Figure 2 is a plan view; Figure 3 is a horizontal section taken along the line 3—3 in Fig. 1, modified to show a diagrammatic water injection system; Figure 4 is a sectional view taken along the line 4—4 in Fig. 1; Figure 5 is a front elevation of the chamber; Figure 6 is a side elevation of the structure; and Figure 7 is a vertical section taken along line 7—7 in Figure 1.

As illustrated in the drawings, the stratosphere chamber 10 comprises a sheet metal exterior 11 provided with supporting members 12. These members are embedded in insulation 13 such as "Sanocel." An inner skin 14 preferably hermetically seals the insulation from the interior of the chamber.

The testing chamber proper 15 is contained in the upper front portion of the structure and is provided with a door 16 having a large portion thereof provided with a glass window 17. The door is mounted on hinges 18 and is pressed against a framing gasket 19 by suitable means such as the bolts 20.

A preferred device has a total overall height of approximately 8' 2" and length of 9' 3" and width of 5' 6" within which is accommodated a testing chamber having a clear width of 4' in each direction. The back of the chamber is defined by a baffle 25 extending upwardly from the grated flooring 26 slightly more than half-way up the chamber. The baffle wall is slightly flared inwardly at the top. The rear wall of the chamber is formed by an insulated partition 27 having an opening 28 provided with a pair of dampers 29 which may be manually or automatically controlled. A passageway 30 is formed by the baffle and the partition wall 27. Heating coils 31, preferably electrical, are provided within this passageway.

Below the foraminous bottom 26 is a pan 32, shown most clearly in Figure 3. On each side of this pan is a hot water manifold 33 equipped with a plurality of spaced spray nozzles 34 which are provided with water at suitable temperature through the valve line 35. This water is supplied from a mixing chamber 36 outside the structure. This mixing chamber is of known type in which control valves 37 and 38 determine the proportion of hot water from the heater 39 and cold water from the line 40 which are supplied to the spray. A thermometer 41 is maintained within the mixing chamber and water is supplied to the sprays at predetermined temperature.

The temperature of the water is determined by the humidity desired within the structure and in each case water is supplied at the dew point. For example, if the temperature within the testing chamber is to be 90° F. and the humidity selected is one which would produce a wet bulb temperature of 80° F. the spray water will be introduced at 80° F., thereby automatically bringing the humidity to the desired point and not beyond it.

Below the pan 32 is a fan 50. The fan has inlet entrances 51 and 52 at each side of the structure and these are so arranged as to draw all of the air entering the fan over the pan and through the water spray. Air from the pressure side of the fan passes into the chamber 53 and from there either through the cooling system 54 or the heating passage 30, or through both. This action is controlled by the automatic dampers 55 and 56. In advanced position, these dampers meet and block the passageway 57 to the cooling coils and when completely withdrawn the upper damper 56 blocks the heating passage 30. At intermediate positions, they regulate the proportions of air passing to the heating and cooling devices.

Cooling is accomplished by expansion coils 60 which are supplied with suitable refrigerant from any suitable type of compressor. The compressor may be driven by the motor 61. If the compressor is maintained within the stratosphere chamber, it is supplied with a hermetically sealed ventilating system and fan for removing heat therefrom and is insulated from the remainder of the system. It is preferred, however, to operate the compressor outside of the unit and to admit liquid refrigerant from outside to the coil 60.

Air from the fan 50 moves through the chamber 53 and the chamber 58, through the coils 60 to the chamber 65 and then through the dampers 29 to the testing chamber itself. The volume of the cooling chamber is of the same order, that is approximately the same size, as the volume of the testing chamber. The temperature of the air leaving the coils is controlled in any suitable manner by any customary system. In the same manner the temperature of the air through the heating passage 30 is controlled, preferably by regulation of the temperature of the heating coils 31 to produce the desired temperature within the testing chamber.

On an operation in which the air in the testing chamber 15 is maintained below atmospheric, the dampers 55 and 56 are automatically opened until the necessary cooling has been accomplished whereupon the dampers are closed and the air bypassed through the passage 30, the heating coils, of course, not being operated during such a cycle.

Inasmuch as most equipment is subjected to a cycle of heat followed by cold or vice versa, it is preferred to accumulate cooling capacity during a heating cycle. The present system permits bypassing of air through the passage 30 while cooling capacity is being accumulated in the coils 60 and thereby greatly reduces the extent of these coils as compared to what would be necessary if such accumulation were not possible. The air in the testing chamber may be almost completely replaced by precooled air from the cooling chamber in order to effect a rapid reduction of the temperature within the testing chamber.

The pressure within the chamber 15 is regulated by any suitable evacuation apparatus through the line 70.

An air inlet 75 through the chamber is provided so that fresh air may be constantly supplied for the operation of gasoline motors or the like. It is also preferred to provide one or more electrical connections 80 within the chamber for the operation of electric motors and other electrical equipment during testing.

The arrangement of the spray pan beneath the floor of the chamber permits maximum width of the air passage with consequent reduction of load upon the fan and maximum available area for the spray. It also produces a system in which the possibility of dripping from the humidifying system into the testing chamber is completely avoided. A drain 81 is provided at the bottom of the cooling compartment 58 and there is another drain 82 at the bottom of the chamber 53.

It will be noted that the cooling section of the structure is completely insulated from the heating section but, nevertheless, the two systems are controlled by the same fan.

The present structure also permits the use of a full opening door completely unobstructed so that as much as is desired thereof may be made of glass to permit ready inspection of the operations inside the chamber.

The sprays, of course, are run only on a heating cycle except where 100% humidity is required. On a heating cycle, the air is first humidified close to 100% humidity and is then heated to the desired temperature. The use of water at the dew point automatically adjusts the humidity to the proper point. The amount of water required is surprisingly low. For example with a fan having a capacity of 6,000 cubic feet per minute, only two or three gallons of spray water are required.

The evacuating equipment is designed to produce pressures as low as 1 inch of mercury while supplying sufficient air to the system to operate any equipment within the chamber. The cooling system is designed to produce temperatures as low as minus 75° F. and the heating system will produce temperatures as high as 200° F. Both heating and cooling are designed to handle humidities between 0 and 100. Low humidities may be produced by pretreatment of the air through the cooling system or by the use of known desiccants which may readily be placed in the fresh air inlet 75.

The foregoing detailed description has been given for clearness of understanding only, and no unnecessary limitations should be understood therefrom.

What I claim as new, and desire to secure by Letters Patent, is:

1. A testing device comprising a hermetically sealed insulated housing, a testing chamber within an upper portion of the housing and occupying a substantial proportion of the internal area of the housing, a foraminous floor in the chamber, a fan within the housing having its suction side in communication with the floor, spray means between the floor and the suction side of the fan, alternatively selective passageways leading from the fan to the testing chamber, cooling means in one of the said passageways, said last named passageway having a volume of the same order as the volume of the testing chamber, optionally selective heating means in the other passageway and means for proportioning the volume of air through said alternatively selective passageways.

2. A testing device comprising an insulated hermetically sealed housing, a testing chamber within an upper portion of the housing, the floor of said testing chamber being foraminous, means for withdrawing air from the testing chamber through said floor, spray means directly beneath the floor and completely cutting the path of all air so withdrawn, means for returning the air to the testing chamber comprising alternatively selective passageways leading from the withdrawal means to the testing chamber, optionally selective heating means in one of said passageways, cooling means in the other passageway, said other passageway having a proportionately large volume whereby air in said testing chamber may be withdrawn therefrom and substantially completely replaced by air from said other passageway to effect a rapid reduction of the temperature in said testing chamber.

ARNOLD H. HEINEMAN.

REFERENCES CITED

The following references are of record in the file of this patent:

UNITED STATES PATENTS

| Number | Name | Date |
|---|---|---|
| 2,026,079 | White et al. | Dec. 31, 1935 |
| 2,223,669 | Forshee et al. | Dec. 3, 1940 |
| 2,254,185 | Newton | Aug. 26, 1941 |
| 2,299,867 | Wolfson | Oct. 27, 1942 |
| 2,303,094 | Sharpe | Nov. 24, 1942 |
| 2,373,333 | St. Onge | Apr. 10, 1945 |

FOREIGN PATENTS

| Number | Country | Date |
|---|---|---|
| 686,840 | France | Apr. 22, 1930 |

Certificate of Correction

Patent No. 2,482,753 September 27, 1949

ARNOLD H. HEINEMAN

It is hereby certified that errors appear in the printed specification of the above numbered patent requiring correction as follows:

In the grant, lines 1 and 2, for "assignor to Vacuum Process Corporation, a corporation of Illinois" read *assignor, by mesne assignments, to Guardite Corporation, of Wilmington, Delaware, a corporation of Delaware;* line 12, for "Vacuum Process Corporation, its successors", read *Guardite Corporation, its successors;* and in the heading to the printed specification, lines 3 to 5, for "assignor to Vacuum Process Corporation, a corporation of Illinois" read *assignor, by mesne assignments, to Guardite Corporation, of Wilmington, Delaware, a corporation of Delaware;* and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*